Jan. 1, 1946.   C. B. HUSTON   2,392,151
CONTROL SYSTEM
Filed Jan. 23, 1943
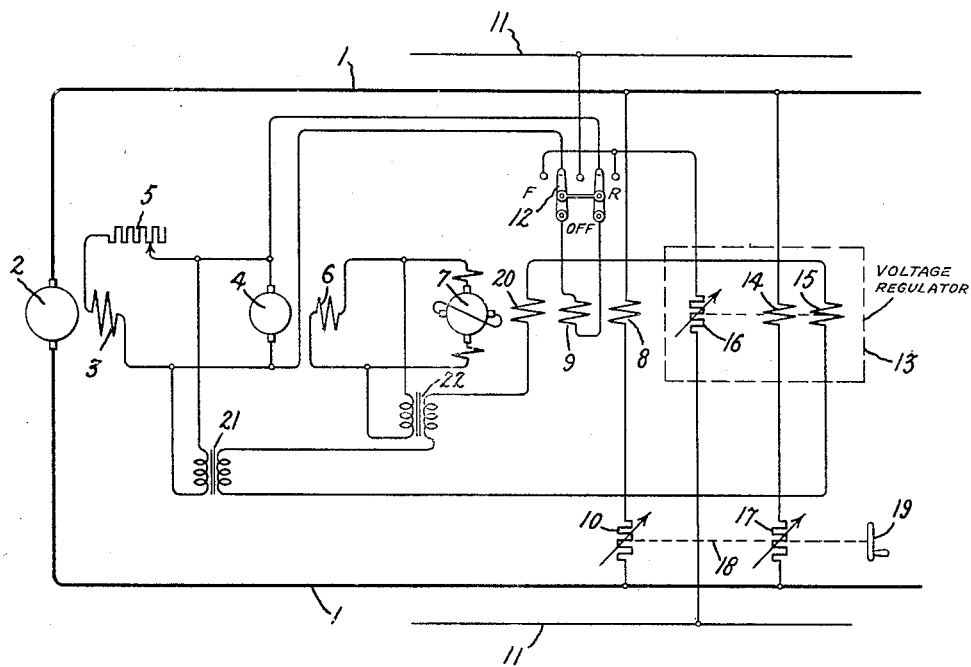
Inventor:
Claude B. Huston,
by Harry E. Dunham
His Attorney.

Patented Jan. 1, 1946

2,392,151

UNITED STATES PATENT OFFICE 2,392,151

CONTROL SYSTEM

Claude B. Huston, Schenectady, N. Y., assignor to General Electric Company, a corporation of New York Application January 23, 1943, Serial No. 473,341

6 Claims. (Cl. 171—312)

This invention relates to automatic control systems and more particularly to improvements in generator voltage control systems.

It is sometimes desirable to be able to adjust the voltage of a dynamo-electric generator from zero to maximum and at the same time hold the voltage constant at any particular setting of the adjusting means. For example, in Ward-Leonard control systems, such as are used in steel mills for controlling the speed of the mill motors over a wide range, the voltage of the generator which energizes the motors must be adjustable from zero to its maximum value and the voltage must stay constant regardless of variations in load, temperature, etc. for any particular setting of the adjusting means. Furthermore, it is very desirable that the automatic regulating means be fast acting so as to restore the voltage to its original value very quickly after the occurrence of a change in operating conditions, such, for example, as a change in load. Heretofore, such fast acting regulating means have not been particularly accurate whereas accurate voltage regulating means have not been particularly fast.

In accordance with the present invention there is provided an improved voltage control system in which a simple and fast acting regulator circuit is combined with an accurate voltage regulator in such a manner that the fast acting circuit provides the basic regulation and any tendency of this circuit to drift out of calibration is corrected more slowly by the automatic regulator.

An object of the invention is to provide a new and improved control system.

Another object of the invention is to provide a new and improved automatic voltage control and voltage regulating system.

The invention will be better understood from the following description taken in connection with the accompanying drawing and its scope will be pointed out in the appended claims.

The single figure of the drawing illustrates diagrammatically an operative embodiment of the invention.

Referring now to the drawing, a main direct-current power circuit whose voltage is to be controlled accurately over a wide range is shown as comprising conductors 1 which are connected to the terminals of a main direct-current generator 2. This generator is provided with a field winding 3 connected across the terminals of an exciter 4 through a conventional field rheostat 5. The exciter 4 has a separately excited field winding 6 which is connected across the output terminals of a high speed pilot exciter 7. Machine 7 is of the armature reaction excited type, the details of one suitable form of which are described and claimed in Patent 2,227,992, granted January 7, 1941, on an application of M. A. Edwards and E. F. W. Alexanderson and assigned to the assignee of the present application. In general, its armature and commutator are similar to the corresponding elements of conventional direct-current machines. However, it has a pair of short-circuited brushes on an axis in quadrature with the load axis of the machine. Its stator field coils are on the axis of the load brushes so that the flux they produce induces a voltage in the armature between the short-circuited brushes with the result that a heavy short-circuit current flows in the armature between the short-circuited brushes, and the armature reaction produced by this short-circuit current is aided by a special pole structure so that a relatively large amount of armature reaction flux threads the armature and it is this cross armature reaction which provides the principal excitation of the machine.

The machine 7 is provided with a control field winding 8 and a reference field winding 9. The control field winding 8 is connected across the main circuit 1 through a rheostat 10 and the reference field winding 9 is normally connected across a substantially constant voltage auxiliary supply circuit 11. These two windings oppose each other with the reference field winding normally stronger than the control field winding. Thus, the reference field winding is, in effect, always trying to raise the voltage of the system, and the control field is always acting to lower the voltage of the system with the result that under steady state conditions the system settles down at a voltage which is determined by the energization of the reference field winding and as this energization is substantially constant by reason of the substantially constant voltage of the auxiliary supply circuit 11 the voltage of the main circuit 1 remains substantially constant. Thus, if the voltage of the main circuit rises above this constant value the net excitation of the system decreases so that the voltage will fall, whereas if the voltage of the main circuit falls below this constant value the net excitation of the system will increase, thus raising the voltage of the main circuit.

In order to control the polarity of the main circuit 1 so as to reverse any motors which are energized therefrom the reference field is connected across the auxiliary supply circuit 11 through suitable switching means 12. This means is shown by way of example as a three-position double-pole switch but it may just as well consist of remotely controlled electromagnetic contactors, if desired. The right-hand and left-hand positions of the switch control the polarity of the system and the mid-position of the switch in which it is illustrated corresponds to the off position of the system, and in this position the reference field winding is connected across the terminals of the exciter 4 with its polarity opposite to that of the control field. This serves to force the voltage of the high speed exciter 7 to a low value to eliminate residual and thus creeping of the main motors. If the circuit of the reference field 9 were opened the control field acting alone would, of course, tend to reduce the voltage of the main circuit to zero but the voltage would go down gradually until the system would operate at its residual voltage below which it could not go with the control field 8 operating alone. However, the opposing action of the reference field 9 when connected across the exciter 4 will tend to kill the residual flux in the excitation system.

The voltage level of the system is adjusted over a wide range by adjusting the rheostat 10 which controls the energization of the control field 8.

The accuracy of the regulation of the system as thus far described can be no greater than the constancy of the voltage of the auxiliary supply circuit 11. In most practical installations this circuit will also supply additional loads which are variable in character so that because of the variable voltage drop produced by these additional loads as well as for numerous other reasons the voltage of the circuit 11 will tend to vary or drift away from normal from time to time. Furthermore, the temperature of the various parts of the system will also vary depending upon the load and how long the system has been in operation and many other factors and this temperature changes the electrical resistance of the various windings, thereby also changing the setting or calibration of the system. In order to correct for these errors I provide an additional automatic voltage regulator 13.

The regulator 13 may be of any suitable type, such, for example, as a conventional direct-acting rheostatic type having a main control winding 14, an anti-hunting winding 15 and a rheostatic element 16 whose resistance is controlled in any suitable manner by the windings 14 and 15. For example, these windings may actuate an electromagnetic armature which is mechanically attached to the rheostat 16 and whose net pull is balanced by a spring.

The rheostatic element 16 is connected in series with the reference field winding 8 and the latter is connected across the auxiliary supply circuit 11. The main control winding 14 of the regulator is connected across the main power circuit 1 through a rheostat 17, and the rheostat 10 and the rheostat 17 are connected for gang operation by suitable means 18 including a hand wheel 19. The purpose of the rheostat 17 is to control the setting of the voltage regulator so that by turning the hand wheel 19 the settings of both the automatic regulator and the automatic regulating circuit are controlled coincidentally.

The regulator 13 detects any drift in voltage of the circuit 1 away from the value for which the regulator is set and it responds to such change by varying the resistance value of the rheostat 16 thereby to vary the energization of the reference field 9 in such a manner as to maintain the voltage of the main circuit 1 at the value for which the regulator is adjusted. The action of this regulator need not be especially fast because the changes in voltage which it corrects for will ordinarily occur relatively slowly and will ordinarily be relatively small in amount. It will be noted, however, that the effect of the voltage regulator is to change the effective value of the reference quantity, that is to say, to change the effective voltage of the auxiliary supply circuit 11 with respect to the reference field 9.

In order to prevent overshooting or hunting of the entire system the high speed pilot exciter 7 is also provided with an anti-hunting winding 20 and this winding may be connected in series with the anti-hunting winding 15 of the regulator across the serially connected secondary windings of a pair of stabilizing or anti-hunting transformers 21 and 22 whose primary windings are connected respectively across the output circuits of the main exciter 4 and the pilot exciter 7.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a dynamo-electric generator, a substantially constant voltage auxiliary supply circuit, exciting means for said generator including a pair of opposing control field windings responsive respectively to the voltage of said generator and to the voltage of said supply circuit, and a direct-acting rheostatic voltage regulator having a main control element connected to be responsive to the voltage of said generator and having a rheostatic element connected to control the energization of one of said field windings.

2. The combination as in claim 1 in which said rheostat is connected to control the energization of the field winding which is responsive to the voltage of said auxiliary supply circuit.

3. In combination, a dynamo-electric machine having an excitation system including two field windings, three variable resistors two of which are connected respectively for controlling said two field windings, and an operating coil for one of said two resistors connected to be responsive to the voltage of said generator, the third resistor being connected to control said coil.

4. In combination, a dynamo-electric machine having an excitation system including two field windings, three variable resistors two of which are connected respectively for controlling said two field windings, an operating coil for one of said two resistors connected to be responsive to the voltage of said generator, the third resistor being connected to control said coil, and means for operating said third resistor and the other one of said two resistors in unison.

5. In combination, a direct-current dynamo-electric generator having an excitation system which is provided with two normally unequal and opposed field windings, the stronger of said field windings being a reference field winding, the weaker of said field windings being a control field winding which is responsive to the voltage of said generator, and means for reversing the polarity of said generator comprising polarity reversing means for said reference field winding.

6. In combination, a direct-current dynamo-electric generator having an excitation system which is provided with two normally unequal and opposed field windings, the stronger of said field windings being a reference field winding, the weaker of said field windings being a control field winding which is responsive to the voltage of said generator, a rheostat for controlling the energization of said control field winding, and means for selectively connecting said reference field winding to said excitation system so as to oppose the action of said control field winding.

CLAUDE B. HUSTON.